United States Patent
Alper et al.

(10) Patent No.: US 10,681,750 B2
(45) Date of Patent: Jun. 9, 2020

(54) METHOD AND APPARATUS FOR SUPPORTING MOBILITY OF USER DEVICE IN MOBILE COMMUNICATION NETWORK

(71) Applicant: Samsung Electronics Co., Ltd., Gyeonggi-do (KR)

(72) Inventors: Yegin Alper, Istanbul (TR); Jung-Shin Park, Seoul (KR); Beom-Sik Bae, Suwon-si (KR); Ji-Cheol Lee, Suwon-si (KR); Jin-Sung Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 211 days.

(21) Appl. No.: 15/536,651

(22) PCT Filed: Dec. 15, 2015

(86) PCT No.: PCT/KR2015/013764
§ 371 (c)(1),
(2) Date: Jan. 4, 2018

(87) PCT Pub. No.: WO2016/099136
PCT Pub. Date: Jun. 23, 2016

(65) Prior Publication Data
US 2018/0152975 A1 May 31, 2018

Related U.S. Application Data

(60) Provisional application No. 62/092,143, filed on Dec. 15, 2014.

(51) Int. Cl.
*H04W 76/12* (2018.01)
*H04W 76/10* (2018.01)
(Continued)

(52) U.S. Cl.
CPC ............ *H04W 76/12* (2018.02); *H04W 8/08* (2013.01); *H04W 8/26* (2013.01); *H04W 28/02* (2013.01);
(Continued)

(58) Field of Classification Search
CPC .... H04W 76/12; H04W 36/125; H04W 76/16
(Continued)

(56) References Cited

U.S. PATENT DOCUMENTS 7,840,217 B2    11/2010  Patel et al.
8,477,771 B2 *   7/2013  Biswas ................... H04L 41/04
                                                              370/389

(Continued)

FOREIGN PATENT DOCUMENTS

KR    20110066840 A    6/2011
KR    20110071772 A    6/2011
KR    20120071721 A    7/2012

OTHER PUBLICATIONS

"Universal Mobile Telecommunications System (UMTS); Architecture Enhancements for Non-3GPP Accesses (3GPP TS 23.402 version 9.13.0 Release 9)", ETSI TS 123 402 v9.13.0, Jul. 2014, 204 pages.

*Primary Examiner* — Shahriar Behnamian

(57) ABSTRACT

The present invention relates to a 5G or pre-5G communication system for supporting high data throughput beyond the 4G communication systems such as LTE. A method for a server for supporting the mobility of a user equipment (UE) in a mobile communication network comprises the steps of: establishing an IP flow with the UE utilizing a first IP address to transceive data; receiving a message comprising a second IP address allocated to the UE and an identifier for the IP flow; generating a tunnel interface for communicating with the UE having the second IP address as the ending IP address, and binding the IP flow allocated to the
(Continued)

identifier to the generated tunnel interface; and transceiving data with the UE by means of the tunnel interface.

20 Claims, 19 Drawing Sheets

(51) Int. Cl.
*H04W 8/08* (2009.01)
*H04W 8/26* (2009.01)
*H04W 28/02* (2009.01)
*H04W 76/16* (2018.01)
*H04W 36/12* (2009.01)

(52) U.S. Cl.
CPC ......... *H04W 36/125* (2018.08); *H04W 76/10* (2018.02); *H04W 76/16* (2018.02)

(58) Field of Classification Search
USPC ....................................................... 455/450
See application file for complete search history.

(56) References Cited

U.S. PATENT DOCUMENTS

| | | |
|---|---|---|
| 9,118,721 B1 * | 8/2015 | Breau ................. H04L 61/2007 |
| 2010/0208698 A1 | 8/2010 | Lu et al. |
| 2011/0149909 A1 | 6/2011 | An et al. |
| 2012/0163219 A1 | 6/2012 | Lee et al. |
| 2017/0238213 A1 * | 8/2017 | Bezawada ......... H04W 36/0005 370/331 |

* cited by examiner

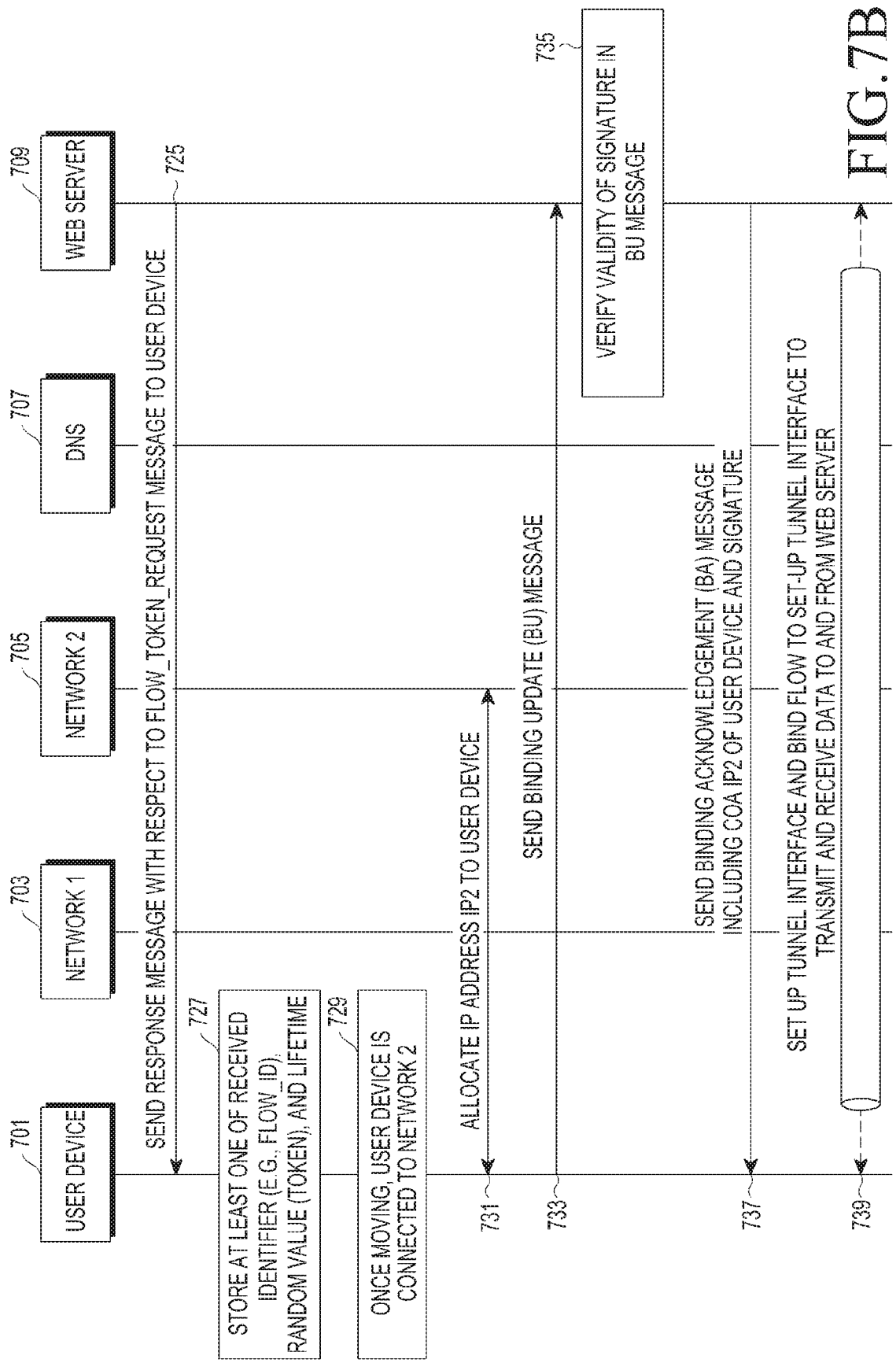

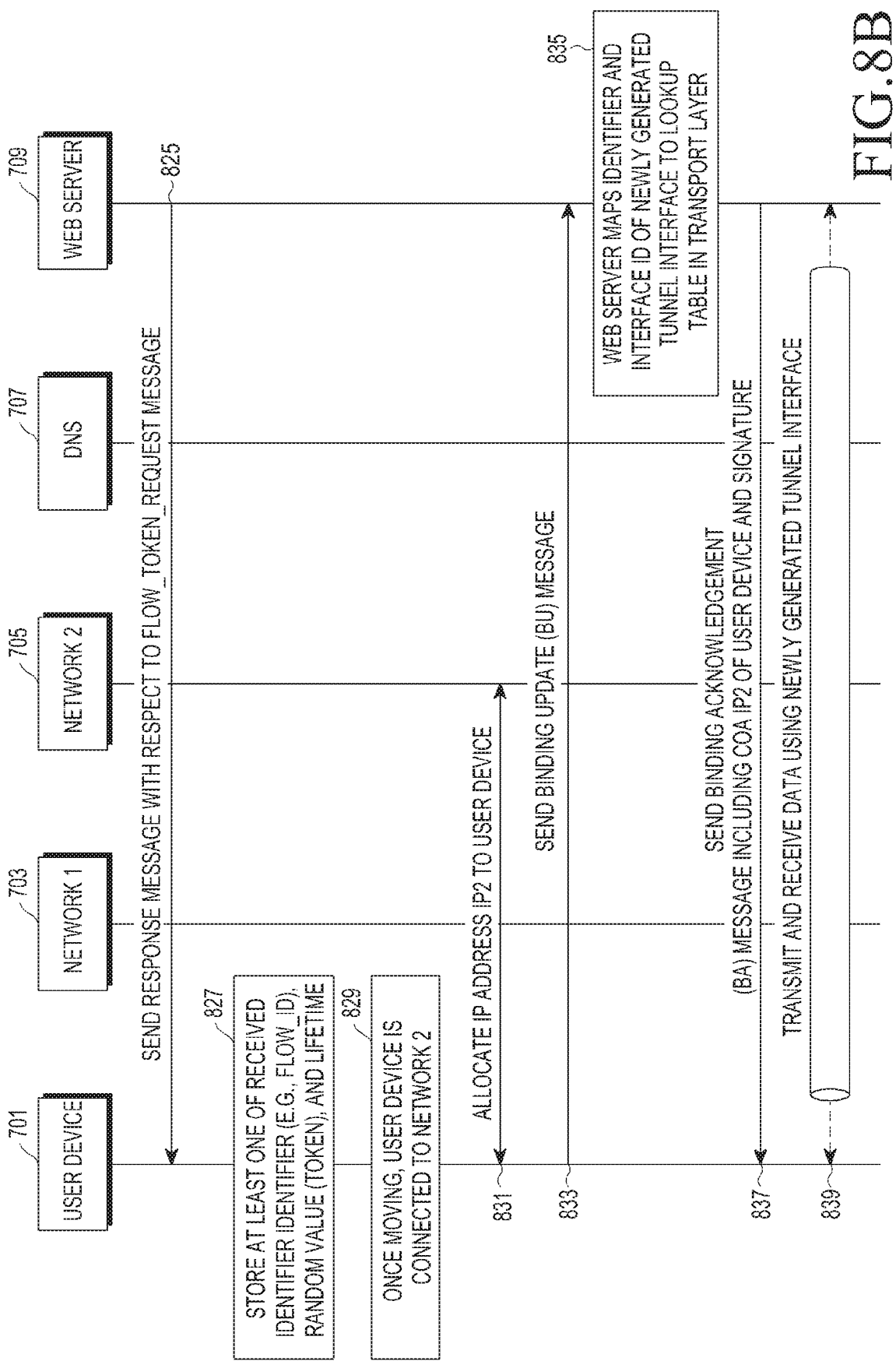

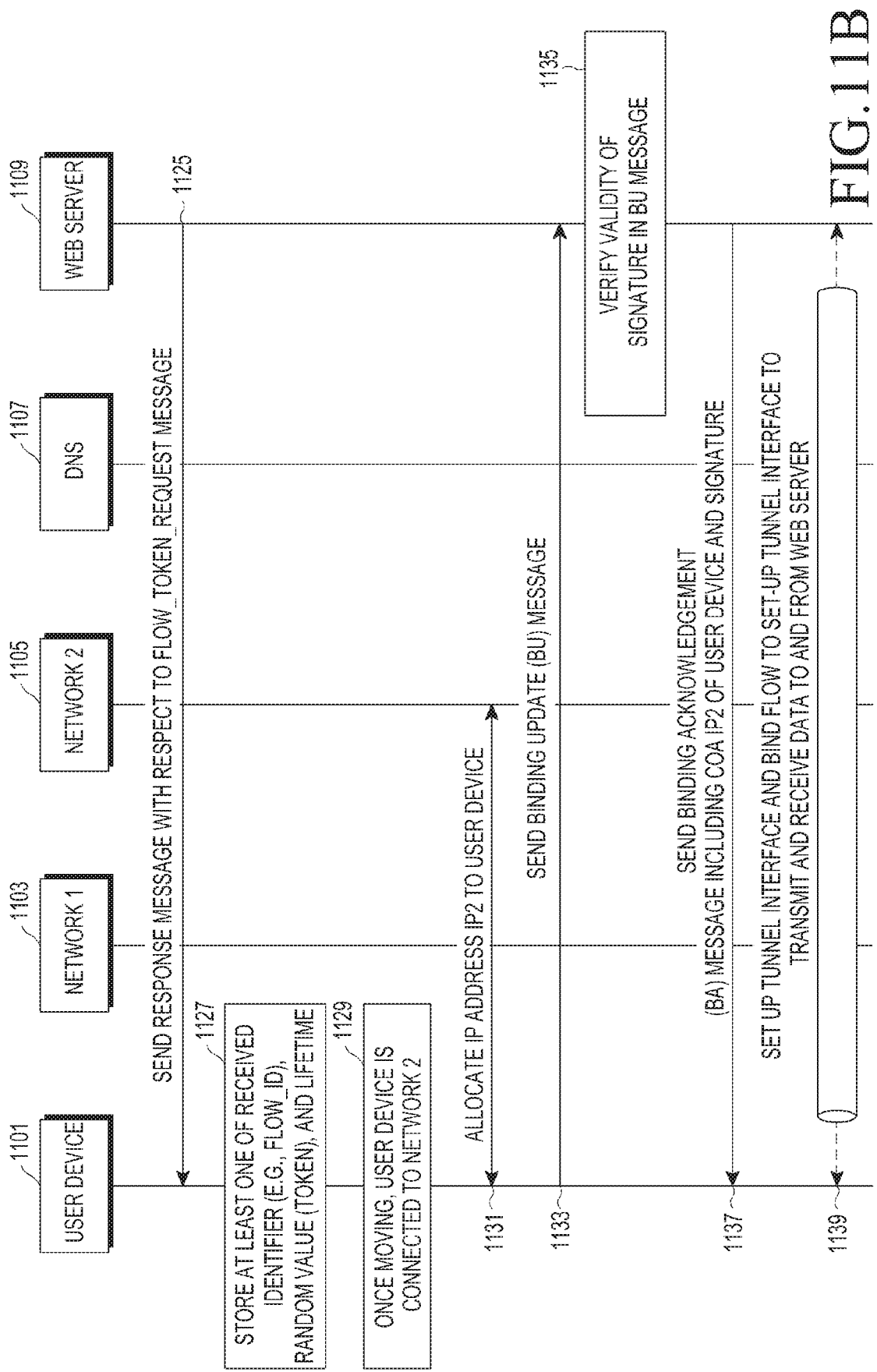

METHOD AND APPARATUS FOR SUPPORTING MOBILITY OF USER DEVICE IN MOBILE COMMUNICATION NETWORK

CROSS-REFERENCE TO RELATED APPLICATION(S) AND CLAIM OF PRIORITY

The present application is related to and claims priority under 35 U.S.C. § 365 to International Patent Application No. PCT/KR2015/013764 filed Dec. 15, 2015, entitled "METHOD AND APPARATUS FOR SUPPORTING MOBILITY OF USER DEVICE IN MOBILE COMMUNICATION NETWORK", which claims priority to U.S. Provisional Patent Application No. 62/092,143 filed Dec. 15, 2014, both of which are incorporated herein by reference into the present disclosure as if fully set forth herein.

TECHNICAL FIELD

The present disclosure relates to a method and apparatus for supporting mobility of a user equipment (UE) in a mobile communication network.

BACKGROUND

To satisfy demands for wireless data traffic having increased since commercialization of 4th-Generation (4G) communication systems, efforts have been made to develop improved 5th-Generation (5G) communication systems or pre-5G communication systems. For this reason, the 5G communication system or the pre-5G communication system is also called a beyond-4G-network communication system or a post-Long Term Evolution (LTE) system.

To achieve a high data rate, implementation of the 5G communication system in an ultra-high frequency (mm-Wave) band (e.g., a 60 GHz band) is under consideration. In the 5G communication system, beamforming, massive multi-input multi-output (MIMO), full dimensional MIMO (FD-MIMO), an array antenna, analog beamforming, and large-scale antenna technologies have been discussed to alleviate a propagation path loss and to increase a propagation distance in the ultra-high frequency band.

For system network improvement, in the 5G communication system, techniques such as an evolved small cell, an advanced small cell, a cloud radio access network (RAN), an ultra-dense network, a device to device (D2D) communication, a wireless backhaul, a moving network, cooperative communication, coordinated multi-points (CoMPs), and interference cancellation have been developed.

In the 5G system, advanced coding modulation (ACM) schemes including hybrid frequency-shift keying (FSK) and quadrature amplitude modulation (QAM) modulation (FQAM) and sliding window superposition coding (SWSC), and advanced access schemes including filter bank multi carrier (FBMC), non-orthogonal multiple access (NOMA), and sparse code multiple access (SCMA) have been developed.

User devices such as mobile phones, tablet computers, laptop computers, etc., may be connected to various networks. For example, for use of the Internet, a mobile phone may be connected to a network that is set up in a coffee shop or to a network that is provided for free in a library. An Internet protocol (IP) subnet in case of the connection of the mobile phone to the network set up in the coffee shop differs from an IP subnet in case of the connection of the mobile phone to the network provided for free in the library. Such different IP subnets cause different IP addresses allocated to the mobile phone.

Due to the increasing use of handovers among selected IP traffic offload (SIPTO) schemes and techniques standardized in the 3$^{rd}$ Generation Partnership Project (3GPP), an IP address of a user equipment (UE) changes more frequently than before.

During data transmission and reception of a user equipment (UE) based on connection to a first network, if the UE is disconnected from the first network and is connected to another network, e.g., a second network, an IP address of the UE changes. The change of the IP address of the UE interrupts data transmission and reception. For example, if the UE is connected to a network using a transmission control protocol (TCP) and then is disconnected from the network, the connection is released. Since the connection is released, the UE needs to newly set up connection to the network. In another example, if the UE is connected to a network using a user datagram protocol (UDP) and then is disconnected from the network, the UE stops data transmission and reception until receiving a notification regarding a change of the IP address. If the UE has been using a voice over IP (VoIP) call through the connected network, the VoIP call is also stopped.

As such, the change of the IP address of the UE may stop data transmission and reception. To solve the problem, various methods have been used.

In one of those methods, the UE, even when moving, has a fixed IP address using a mobile IP or a general packet radio service (GPRS) tunneling protocol (GTP).

FIG. 1 illustrates a network using a mobile IP or a GTP.

If a user equipment (UE) 101 uses the mobile IP or the GTP, the UE 101 is connected to a packet data network gateway (PGW) or home agent (HA) 107, which is an IP gateway, before being connected to Internet 105 through a radio access network (RAN) 103. The UE 101 is connected to a web server 109 through the PGW or HA 107 and then through the Internet 105 (path 1, 113).

When using the mobile IP or the GTP, the UE 101 may have a unique IP address. Although the UE does not experience a change of the IP address due to the unique IP address, for the unique IP address of the UE, the PGW or HA has to be installed. The installation of the PGW or HA causes extra capital expenditure (CAPEX) and operating expenditure (OPEX), and so forth.

In addition, latency also increases because the UE is connected to the server through the PGW or HA.

Another problem of the mobile IP or the GTP is that the mobile IP or the GTP is not available in all networks. For example, if the UE is connected to a Wireless Fidelity (WiFi) network 111 installed at home or work (path 2, 115), the mobility of the UE may not be supported because of absence of the PGW or the HA. Herein, the mobility of the UE means that the UE, even when moving, may transmit and receive data without disconnection of an IP session.

To solve the aforementioned problem occurring in the use of the mobile IP or the GTP, a mobile IP route optimization (MIP RO) method has been proposed. The MIP RO method transmits and receives data without passing through the PGW or the HA, in spite of using the fixed IP address.

FIG. 2 illustrates the MIP RO method.

For mobile IP route optimization, the UE 101 transmits data directly to the web server 109 through the RAN 103 and the Internet 105 (path 3, 201), instead of transmitting the data through the PGW or the HA 107.

However, the MIP RO method also has some problems described below.

The MIP RO method is applicable only to the mobile IP. That is, the MIP RO method is not applicable when the GTP is used.

Moreover, a data transmission path of the UE 101 does not pass through the HA, but the MIP RO method still needs the HA.

For data transmission and reception to and from the web server 109, the UE 101 needs a separate setup procedure. More specifically, the UE 101 requires twice round-trip signaling (e.g., signaling with a domain name system (DNS) for an inquiry into a domain name of the web server) to set up a direct data transmission path for data transmission and reception to and from the web server 109. The separate setup procedure causes existence of setup latency.

A multi-path transmission control protocol (MPTCP) has been proposed as another method for supporting the mobility of the UE. An existing TCP uses a single path for data transmission and reception, whereas the MPTCP uses multiple paths. By using the multiple paths, even when one path is disconnected, the UE may transmit and receive data seamlessly with another path.

The MPTCP, however, has problems as described below.

The MPTCP is effective only when the TCP is used. That is, application of the MPTCP is not possible for other communication protocols, e.g., a UDP-based real-time transport protocol (RTP), a VoIP, quick UDP Internet connection (QUIC), a stream control transmission protocol (SCTP), etc.

The MPTCP may fail due to interference of a middle box existing on the network. The MPTCP uses a new TCP option (an option that is not supported by the existing TCP), and middle boxes such as a fire wall and network address translators (NATs) interrupt the new TCP option. Some middle boxes may not recognize the new TCP option and thus may give up the new TCP option or all data packets transmitted based on the new TCP option. Some other middle boxes may modify data transmitted based on the new TCP option. A correct operation of a middle box depends on an implementer and arrangement of the middle box, and thus is not actually known.

As a result, the MPTCP is not a fundamental solution for supporting the mobility of the UE, either.

SUMMARY

The present disclosure is provided to support the mobility of a user equipment (UE) without changing a middle box when a TCP is used.

The present disclosure is also provided to solve a problem related to an HA installed for support of the mobility of the UE.

The present disclosure is also provided to solve the incurrence of installation expenditure, operating expenditure, etc., when the HA is needed, and to solve latency caused due to addition of a path in data transmission and reception to and from the HA.

According to the present disclosure, a method for supporting mobility of a user equipment (UE) by a server in a mobile communication network includes establishing an Internet protocol (IP) flow with a user equipment (UE) using a first IP address to transmit and receive data to and from the UE, receiving a message including a second IP address allocated to the UE and an identifier of the IP flow, generating a tunnel interface for communicating with the UE having the second IP address as an end IP address and binding the IP flow allocated to the identifier to the generated tunnel interface, and transmitting and receiving data to and from the UE through the tunnel interface.

According to the present disclosure, a method for a user equipment (UE) that supports mobility in a mobile communication network includes being allocated a first Internet protocol (IP) address from a first network, establishing an IP flow with a server using the first IP address and transmitting and receiving data to and from the server, being allocated a second IP address from a second network, sending a message including the second IP address and an identifier of the IP flow to the server, and transmitting and receiving data to and from the server through the tunnel interface generated by the server.

According to the present disclosure, a server that supports mobility of a user equipment (UE) in a mobile communication network is configured to establish an Internet protocol (IP) flow with a user equipment (UE) using a first IP address to transmit and receive data to and from the UE, to receive a message including a second IP address allocated to the UE and an identifier of the IP flow, to generate a tunnel interface for communicating with the UE having the second IP address as an end IP address and bind the IP flow allocated to the identifier to the generated tunnel interface, and to transmit and receive data to and from the UE through the tunnel interface.

According to the present disclosure, a user equipment (UE) that supports mobility in a mobile communication network is configured to be allocated a first Internet protocol (IP) address from a first network, to establish an IP flow with a server using the first IP address and transmit and receive data to and from the server, to be allocated a second IP address from a second network, to send a message including the second IP address and an identifier of the IP flow to the server, and to transmit and receive data to and from the server through the tunnel interface generated by the server.

According to the present disclosure, a separate HA does not need to exist on a network.

According to the present disclosure, latency is not caused because of absence of an HA separately configured on a network.

According to the present disclosure, a method proposed in the present disclosure is applicable when an IPv4 using an NAT is used.

According to the present disclosure, any type of applications may use a method proposed in the present disclosure based on an IP layer.

BRIEF DESCRIPTION OF THE DRAWINGS

FIGS. 7A and 7B are ladder diagrams of a method for supporting the mobility of a user equipment (UE) according to the present disclosure;

FIGS. 8A and 8B are ladder diagrams of a method for supporting the mobility of another user device according to the present disclosure;

FIGS. 11A and 11B are ladder diagrams of a method that does not use the PCP even when using an NAT, according to the present disclosure;

DETAILED DESCRIPTION

Hereinafter, embodiments of the present disclosure will be described in detail with reference to the accompanying drawings. Moreover, a detailed description of well-known functions or elements associated with the present disclosure will be omitted if it unnecessarily obscures the subject matter of the present disclosure. Further, the terminologies to be described below are defined in consideration of functions in the present disclosure and may vary depending on a user's or operator's intention or practice. Therefore, the definitions should be made based on the contents throughout the entire description of the present disclosure.

Hereinafter, a user equipment (UE) may include a terminal, a user equipment (UE), a mobile station (MS), a cellular phone, a smart phone, a computer, a multimedia system capable of performing a communication function, etc.

A web server refers to an end device that provides a service to the UE.

A network includes a base station, and in the present disclosure, has the same meaning as the base station. An access network means a network to which the UE is connected.

Although the UE is described as being connected with the web server for data transmission and reception in the present disclosure, the UE and the web server may be other devices depending on an environment, a purpose, and so forth.

Figure 1:
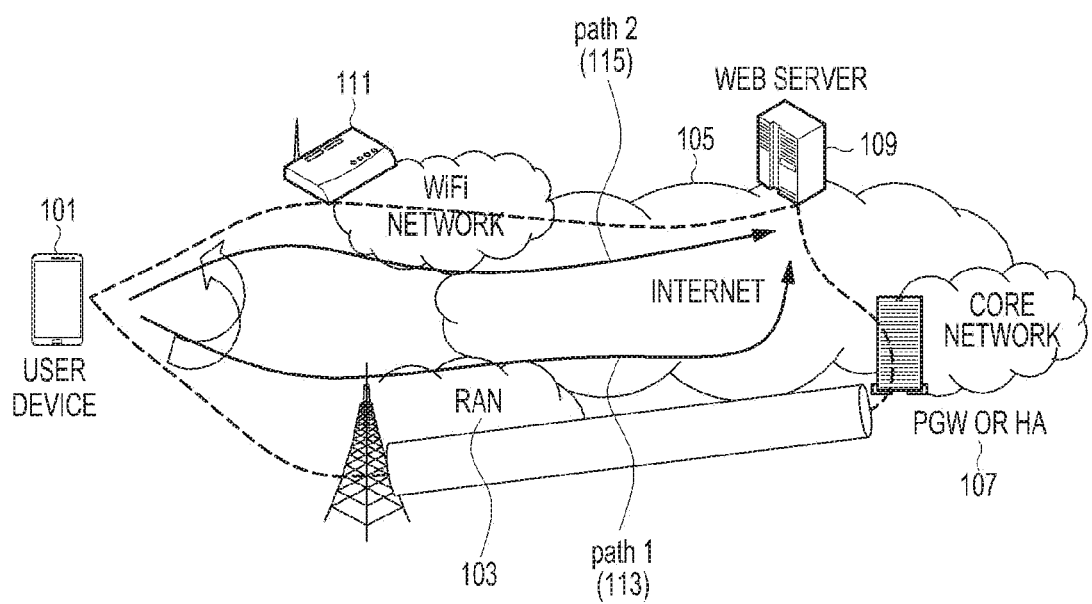
FIG. 1 illustrates a network using a mobile IP or a GTP.
Figure 2:
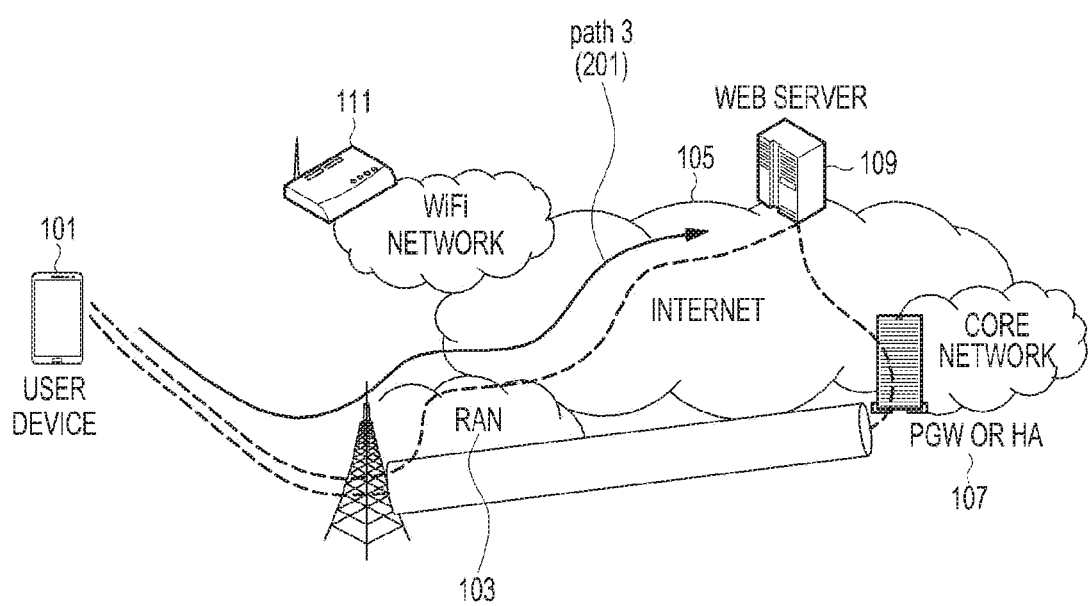
FIG. 2 illustrates an MIP RO method.
Figure 3:
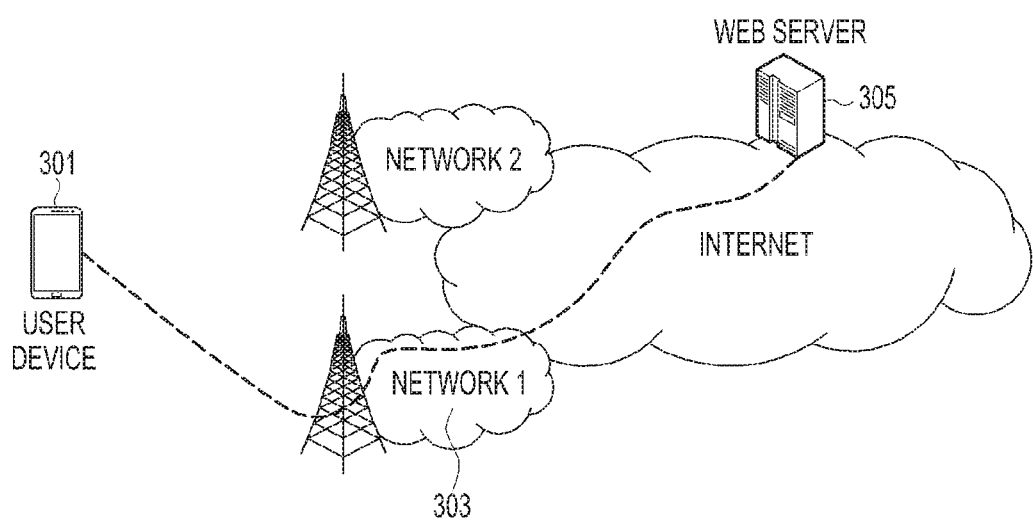
FIG. 3 illustrates an end-to-end data path between a user equipment (UE) and a web server according to the present disclosure.
Figure 4:
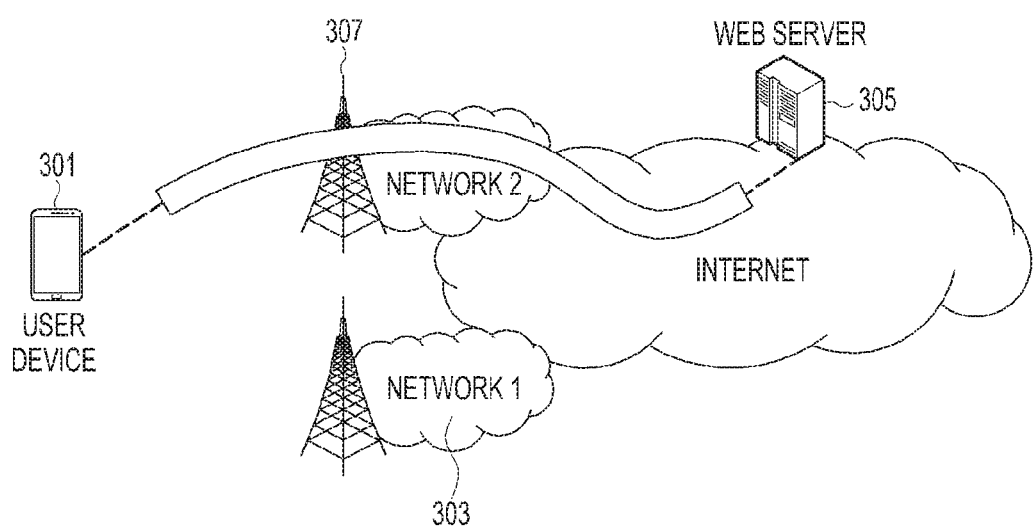
FIG. 4 illustrates a case where the UE is connected to the web server after moving, according to the present disclosure.

FIGS. 3 and 4 illustrate over time a method for supporting the mobility of the UE according to the present disclosure if the UE moves.

FIG. 3 illustrates an end-to-end data path between a user equipment (UE) and a web server according to the present disclosure.

A user equipment (UE) 301 is connected to a network 1 303 and is allocated an IP address IP1 from the network 1 303. The IP address IP1 is managed by the network 1 303. That is, a home of the IP address IP1 is the network 1 303. The network 1 303 has a special forwarding entry that forwards data, which is to be forwarded to the IP address IP1, to the UE 301.

The UE 301 transmits and receives data to and from a web server 305 by using the allocated IP address IP1. Thus, the UE 301 initiates an end-to-end (e2e) IP flow with the web server 305.

FIG. 4 illustrates a case where the UE 301 is connected to the web server 305 after moving, according to the present disclosure.

Once the UE 301 moves, the UE 301 may be disconnected from the network 1 303 and may be connected to a network 2 307.

If the UE 301 is connected to the network 2 307, the UE 301 is allocated a new IP address IP2 from the network 2 307. The IP address IP2 is managed by the network 2 307.

According to the present disclosure, the UE 301 may use the IP address IP1 even if being disconnected from the network 1 303. To maintain the IP address IP1, the UE 301 engages in signaling with the web server 305. The signaling will be described later. As a result of the engagement of the UE 301 in the signaling, even if the home of the IP address IP1 is still the network 1 303, the 'special forwarding entry' that may be implemented inside the web server 305 transmits a packet of the IP address IP1 to the UE 301 connected to the network 2 307, in place of to the network 1 303. A device such as the web server 305 may be referred to as a device having an IP deflector for the IP address IP1.

The UE 301 may not directly communicate using the IP address IP1 because of actually having the IP address IP2 instead of the IP address IP1. That is, an operation of changing the IP address IP1 to the IP address IP2 or the IP address IP2 to the IP address IP1 between two ends, that is, the UE 301 and the web server 305 is required. In other words, tunneling between the UE 301 and the web server 305 is performed, and IP addresses of ends of the tunnel may be the IP address IP2 and an IP address of the web server 305.

Figure 5:
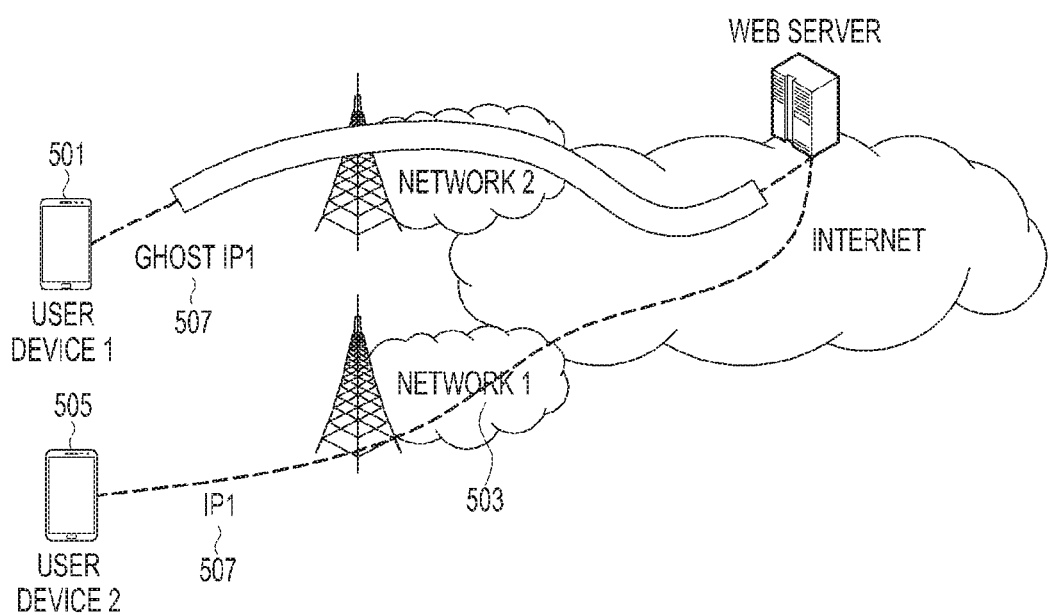
FIG. 5 illustrates multiple user devices having an identical IP address according to the present disclosure.

FIG. 5 illustrates multiple user devices having an identical IP address according to the present disclosure.

If a user equipment (UE) is allocated an IP address from an access network and moves beyond an influencing range of the access network, the IP address becomes meaningless to the UE. Thus, the UE returns the IP address to the access network.

However, according to the present disclosure, a user equipment (UE) 501 may continuously have an IP address 507 even if moving beyond an influencing range of an access network 503. In the present disclosure, the IP address 507, which is allocated to the UE, but is not returned, will be referred to as a ghost IP address. The access network may allocate the IP address 507 to another user device 505 without being aware of the UE continuously using the IP address 507. That is, another user device may have an identical IP address at the same time.

On the Internet, different hosts may not be able to use an identical IP address. This is because due to an Internet routing structure, if different Internet hosts use an identical IP address, a host that forwards data may not be known.

However, according to the present disclosure, even if multiple host IP addresses that are identical to an actual IP address exist, an operation may be possible without any problem. This is because the multiple identical ghost IP addresses are not an actual physical IP address.

The ghost IP address is removed upon termination of data transmission and reception or after the elapse of a specific time.

Figure 6:
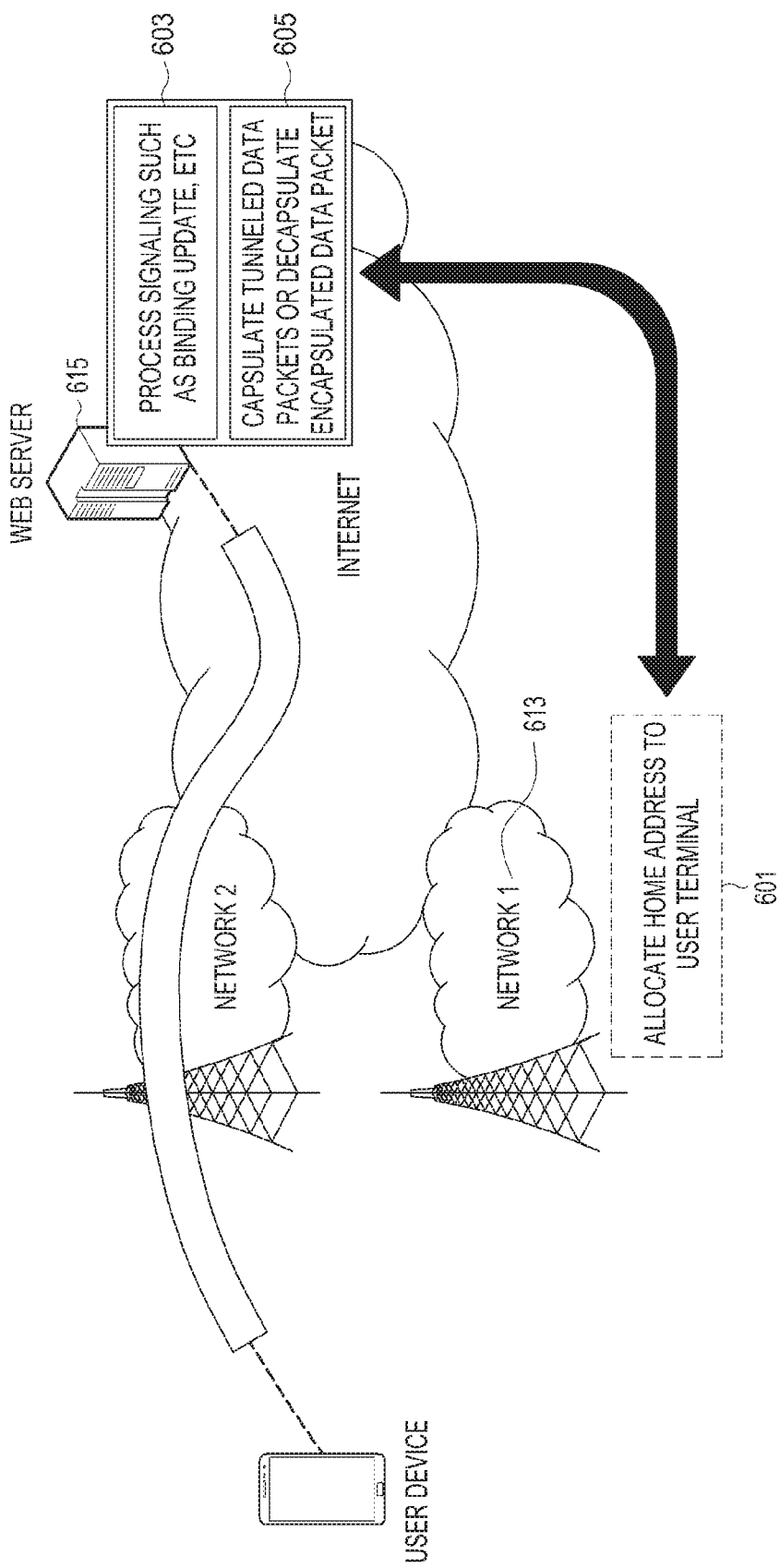
FIG. 6 illustrates functions of elements on a network according to the present disclosure.

FIG. 6 illustrates functions of elements on a network according to the present disclosure.

The HA basically has three functions.

A first function 601 is allocating a home address to a user terminal. A second function 603 is processing signaling such as binding update, and so forth. A third function 605 is encapsulating tunneled data packets or releasing encapsulated data packets.

According to the present disclosure, a web server 615 performs some functions of the HA. More specifically, an access network 613 performs the first function 601 of the HA, and the web server 615 performs the second function 603 and the third function 605 of the HA.

The access network 613 allocates an IP address to user devices without considering a ghost IP address. That is, a function of the access network 613 does not change even according to the present disclosure.

Thus, the web server supports the mobility of a user equipment (UE).

Figure 7A:
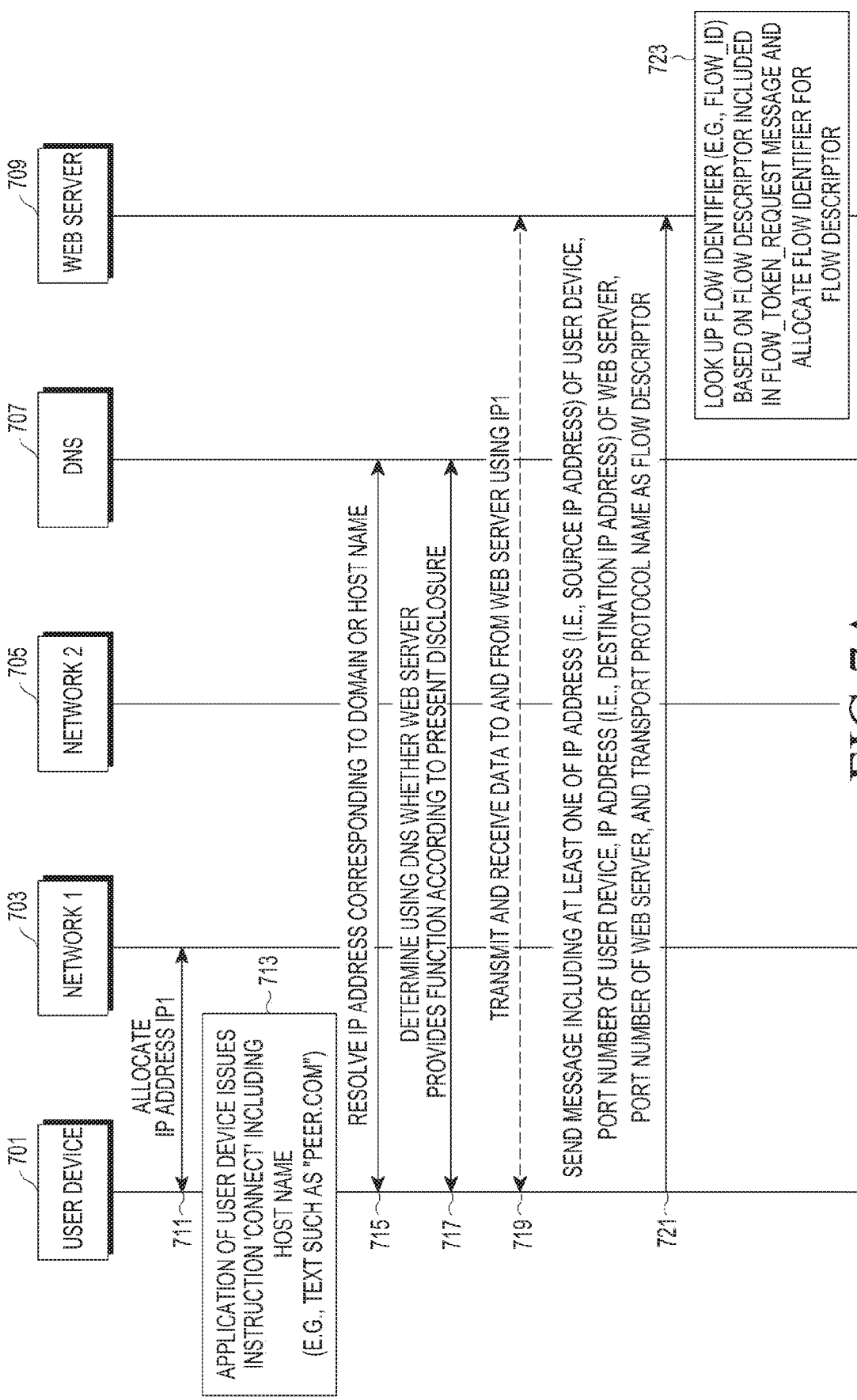

FIGS. 7A and 7B are ladder diagrams of a method for supporting the mobility of a user equipment (UE) according to the present disclosure;

Once a user equipment (UE) 701 is connected to a network 1 703, the network 1 703 allocates an IP address IP1 to the UE 701 in operation 711.

The UE 701 that desires to connect to a web server 709 may use an application. Once the application of the UE 701 issues an instruction 'connect' including a host name (e.g., a text such as "peer.com") in operation 713, the UE 701 obtains an IP address of the web server 709 using a domain or host name and attempts connection to the web server 709.

To this end, the UE 701 looks up the domain or host name in a domain name system (DNS) 707 and resolves an IP address corresponding to the domain or host name in operation 715.

Selectively, the UE 701 determines using the DNS 707 whether the web server 709 provides a function according to the present disclosure in operation 717. The web server 709, which supports functions according to the present disclosure, that is, the second function and the third function of the HA (i.e., the function of processing signaling such as binding update, etc., and the function of encapsulating tunneled data packets or decapsulating the encapsulated data packets), may be stored in the DNS 707 as a new entry (i.e., a new domain or host name) in place of the domain or host name. The new entry may be generated in a form in which a predefined sub domain (e.g., "ha", etc.) is added in the front of the domain or host name of the web server 709 (e.g., "ha.peer.com").

The UE 701 sends a request for an IP address of the domain (e.g., "ha.peer.com") to the DNS 707. Once the DNS 707 transmits the IP address of the domain to the UE 701, the UE 701 determines that the web server 709 provides a function according to the present disclosure. However, if the DNS 707 does not transmit the IP address of the sub domain to the UE 701, the UE 701 determines that the web server 709 does not provide a function according to the present disclosure.

Alternatively, a resource records type of a DNS instead of the sub domain may be newly defined. With a new indicator in the resource records type of the DNS, the UE may determine whether the web server provides a function according to the present disclosure. In other words, the UE explicitly looks up the DNS of the new type to determine whether the web server provides a function according to the present disclosure.

The UE 701 transmits and receives data to and from the web server 709 by using the IP address IP1 in operation 719. Operation 719 may be performed regardless of operation 717. Thus, even if operation 717 is performed in addition to conventional operations, any delay does not occur.

The UE 701 transmits a message including an IP address (i.e., a source IP address) of the UE 701, a port number of the UE 701, an IP address (i.e., a destination IP address) of the web server 709, a port number of the web server 709, and a transport protocol name as a flow descriptor in operation 721. For example, the message may be a flow_token_request message.

The web server 709 looks up a flow identifier (ID) (e.g., flow_id) based on the flow descriptor included in the flow_token_request message and allocates the flow identifier for the flow descriptor in operation 723. The web server 709 allocates a random value (i.e., a token) as an encryption secret key. The encryption secret key may be used together (i.e., bound) with the identifier. An infinite lifetime exists in binding between the secret key and the identifier, and the binding is not maintained permanently.

The web server 709 sends a response message with respect to the flow_token_request message to the UE 701 in operation 725. The response message may include at least one of the identifier (e.g., flow_id), the random value (token), and the lifetime. The response message may be a flow_token_request message.

The UE 701 stores at least one of the identifier (e.g., flow_id), the random value (token), and the lifetime that are received for future use in operation 727. Upon expiry of the lifetime, the binding between the identifier and the token is automatically deleted and the flow established by the UE 701 with the web server 709 is released. Thus, to prevent the flow from being released, the binding between the flow identifier (e.g., flow_id) and the token needs to be refreshed by sending, by the UE 701, a new flow_token_request message to the web server 709 prior to the expiry of the lifetime. In this way, even if the UE 701 is not allocated a fixed IP address, the IP flow is not released when the UE 701 moves, such that the UE 701 may be assured of continuity of the IP session.

Once the UE 701 moves, the UE 701 is connected to a network 2 705 in operation 729.

The network 2 705 allocates an IP address IP2 to the UE 701 in operation 731.

If an IP flow exists for ongoing transmission and reception between the UE 701 and the web server 709, the UE 701 sends a binding update (BU) message to the web server 709 in operation 733. The BU message may include at least one of the identifier (e.g., flow_id), a care-of address (CoA), and a signature. Selectively, a ghost IP address may be further included in a home address (HoA) field of the BU message.

The ghost IP address is an IP address (i.e., IP1) allocated to the UE 701 from the network 1 703. The CoA is an IP address (i.e., IP2) allocated to the UE 701 from the network 2 705. Since the UE 701 moves beyond an influencing range of the network 1 703, the IP address IP1 is a ghost IP address.

The signature is used to demonstrate that the UE 701 is an owner of an end-to-end flow identified by the flow identifier (e.g., flow_id), and the demonstrated owner is authorized to update a destination to which the flow is to be forwarded. The signature is generated using the token (an encryption secret key). The signature may be generated using a one-way keyed hash (e.g., keyed-hash message authentication code (HMAC)-SHA 256), which uses the token, for contents of the BU message.

The web server 709 verifies validity of the signature in the BU message before processing the BU message in operation 735. More specifically, in case of failing to verify the validity of the signature, the web server 709 ignores the BU message. However, in case of succeeding in the verification of the validity of the signature, the web server 709 generates a tunnel interface for forwarding a packet of the flow. (That is, the web server 709 binds the flow to the generated tunnel interface.) An end IP address of the tunnel interface (which is not the ghost IP address IP1) is the IP address (i.e., CoA) IP2 which is allocated to the UE 701 from the network 2 705 after movement of the UE 701.

The web server 709 sends a binding acknowledgement (BA) message including the CoA IP2 of the UE 701 and the signature to the UE 701 in operation 737. Selectively, the BU message may include the HoA IP1. The signature may be generated as described above in operation 733.

The UE 701 verifies validity of the signature in the BA message before processing the BA message. More specifically, in case of failing to verify the validity of the signature, the UE 701 ignores the BA message. However, in case of succeeding in the verification of the validity of the signature, the UE 701 sets up the tunnel interface and binds the flow to the set-up tunnel interface to transmit and receive data to and from the web server 709 in operation 739. In this way, without releasing the flow initiated by the network 1 703 between the UE 701 and the web server 709, the UE 701 may transmit and receive data through the flow by using an IP address (CoA) allocated after moving to the network 2 705. That is, continuity of the IP session is guaranteed.

If the UE 701 moves again during data transmission and reception, operations 729 through 739 are repeated.

Once data transmission and reception are terminated, the UE 701 sends the BU message to the web server 709. In this case, a lifetime included in the BU message is set to 0. The lifetime '0' may mean that the UE 701 is to terminate connection with the web server 709. The BU message in which the lifetime is set to 0 may mean termination of the flow.

As described above, the ghost IP address may be allocated to another user device. The web server may simultaneously communicate with a user equipment (UE) having the ghost IP address and another user device having the ghost IP address as an actual IP address. In this case, the web server needs a scheme for simultaneously communicating with multiple user devices having an identical IP address. Generally, in light of the web server, such communication is based on the IP address of the UEs. According to the present disclosure, assuming that a ghost IP address is used for a dedicated tunnel interface, data transmission and reception are related to the dedicated tunnel interface as well as an IP address of a user equipment (UE).

Figure 8A:
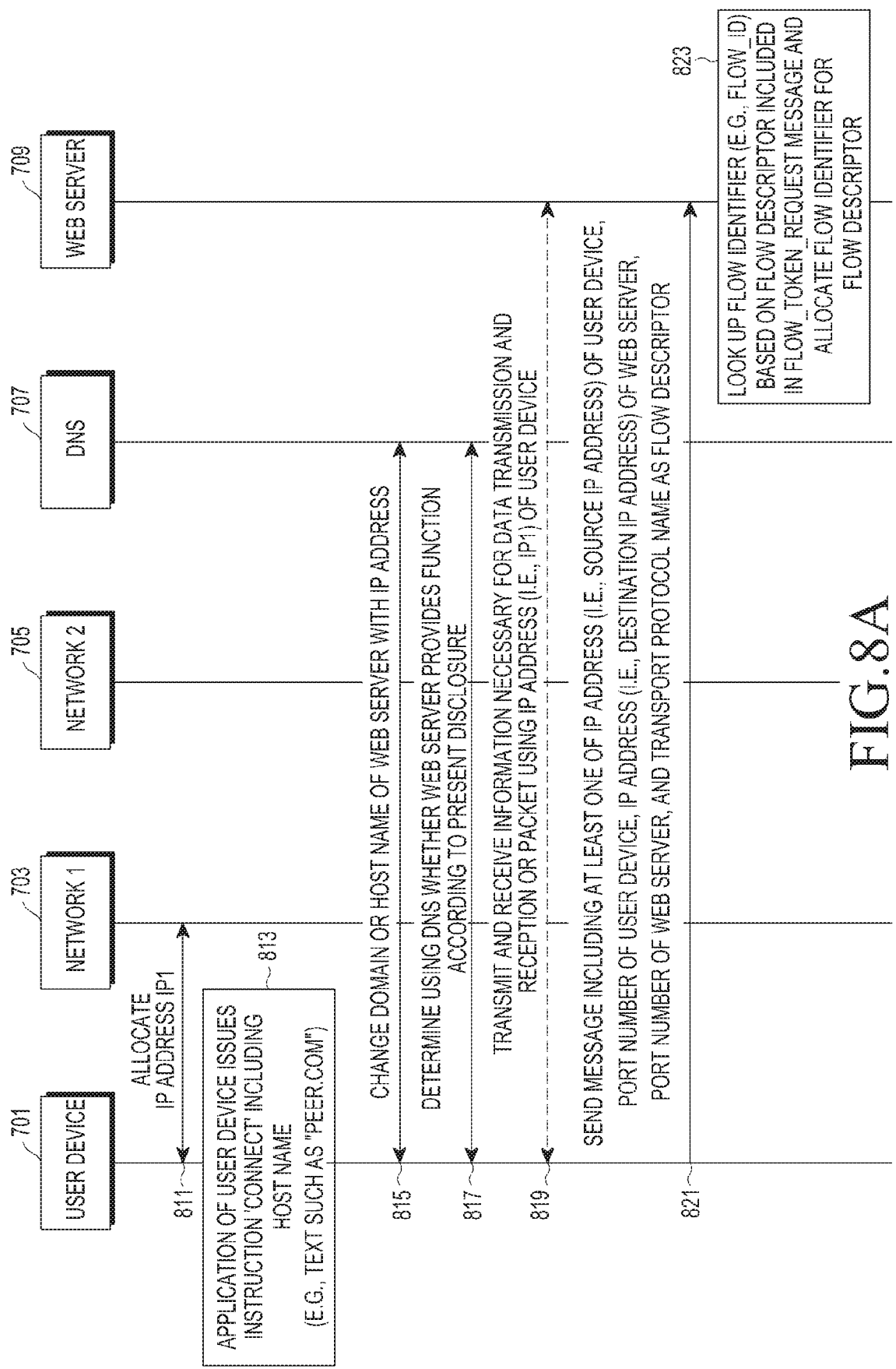

FIGS. 8A and 8B are ladder diagrams of a method for supporting the mobility of another user device according to the present disclosure.

Operations 811, 813, 815, 817, 821, 825, 827, 829, 831, 833, and 837 are the same as operations 711, 713, 715, 717, 721, 725, 727, 729, 731, 733, and 737 of FIG. 7, and thus will not be described.

In operation 819, since the UE 701 and the web server 709 have not transmitted and received data therebetween before, the UE 701 and the web server 709 have not yet been associated with any interface. That is, a flow identifier (e.g., flow_id) has not yet been generated. In this case, the web server 709 transmits information or a packet needed for data transmission and reception to the UE 701 by using an IP address (i.e., IP1) of the UE 701.

Operation 821 is the same as operation 721 of FIG. 7, and thus will not be described.

In operation 823, a flow descriptor is provided to the web server 709 when a transport layer of the web server 709 is implemented, such that the web server 709 may map the flow descriptor to the flow identifier (e.g., flow_id). Thereafter, the flow identifier (e.g., flow_id) is transmitted to the UE 701 in operation 827.

Operations 825, 827, 829, 831, and 833 are the same as operations 725, 727, 729, 731, and 733 of FIG. 7, and thus will not be described.

In operation 835, the web server 709 maps the flow identifier and an interface ID (identification) of a newly generated tunnel interface to a lookup table in the transport layer.

Operation 837 is the same as operation 737 of FIG. 7, and thus will not be described.

In operation 839, once data transmission and reception are bound to the interface ID, the web server 709 and the UE 701 use the newly generated tunnel interface for the data transmission and reception.

Figure 9:
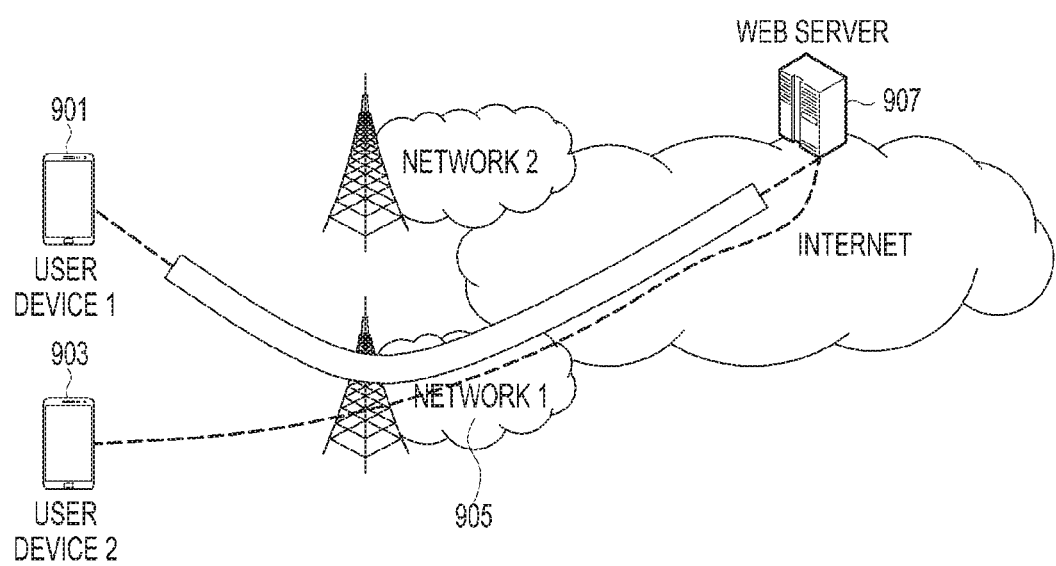
FIG. 9 illustrates a case where a user equipment (UE) returns to a network allocated a ghost IP address, according to the present disclosure.

FIG. 9 illustrates a case where a user equipment (UE) returns to a network that has allocated a ghost IP address to the UE according to the present disclosure.

If a user equipment (UE) 1 901 goes back to a network 905 that has allocated the ghost IP address to the UE 1 901, the UE 1 901 attempts to set the ghost IP address as an actual IP address that is to be actually used.

If there is no user device allocated the ghost IP address from the network 905, the UE 1 901 may set and use the ghost IP address as an actual IP address. The UE 1 901 sets a lifetime to 0 in a BU message and sends the BU message to the web server 907. That is, the UE 1 901 may terminate a currently used tunnel and communicate with the web server 907 using the actual IP address. Thus, the UE 1 901 does not need a flow identifier or a tunnel interface ID to communicate with the web server 907.

However, if another user device 2 903 has been using the ghost IP address allocated thereto when the UE 1 901 returns to a region of the network 905, the UE 1 901 is allocated a new IP address from the network 905. Thereafter, the UE 9 901 uses the new IP address as if being connected to another network and being allocated an IP address. In this case, both the ghost IP address and the new IP address of the UE 1 901 are allocated from the network 905.

Figure 10A:
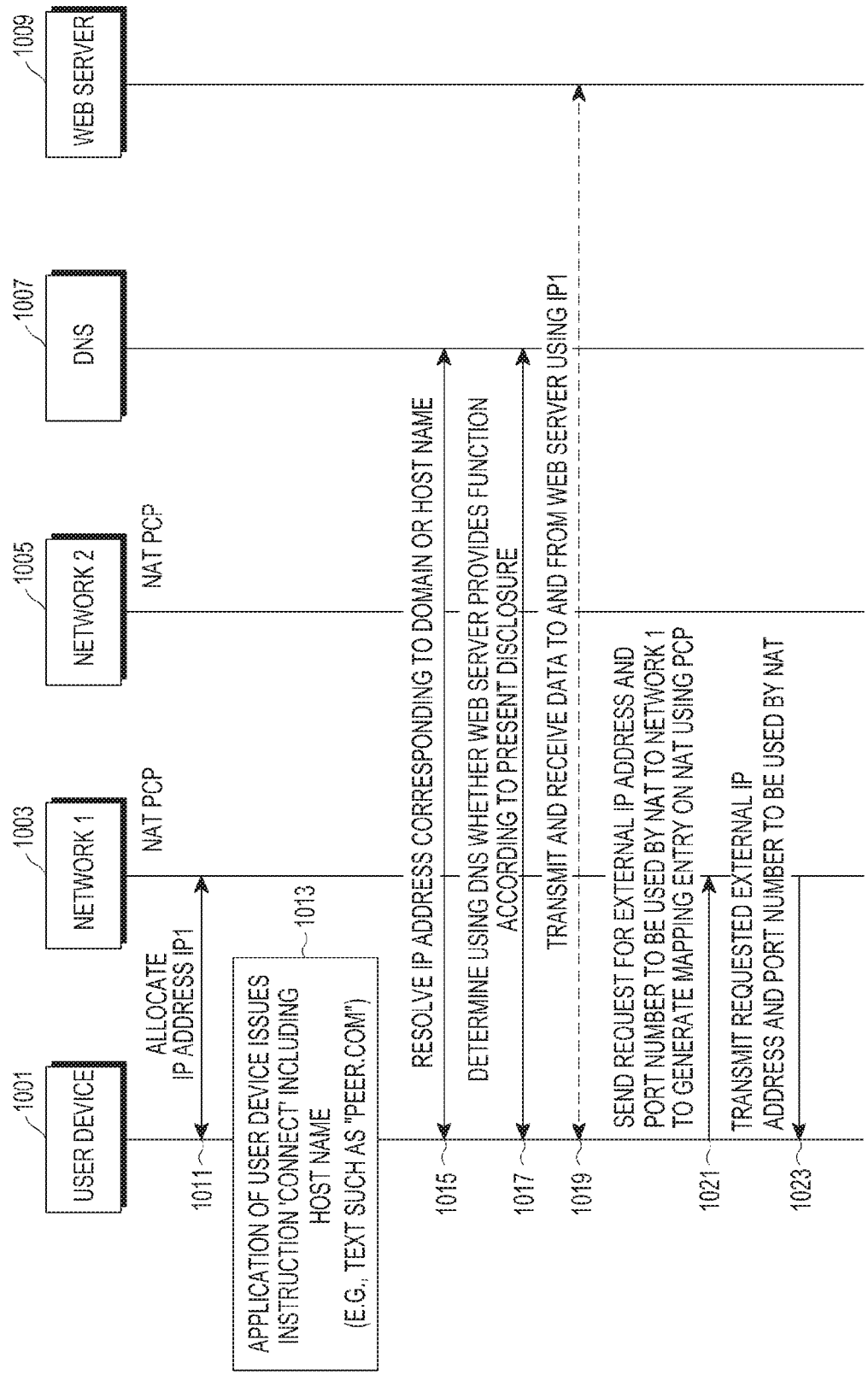
FIGS. 10A through 10C are ladder diagrams of a method using a port control protocol (PCP) (RFC 6887) according to the present disclosure.
Figure 10B:
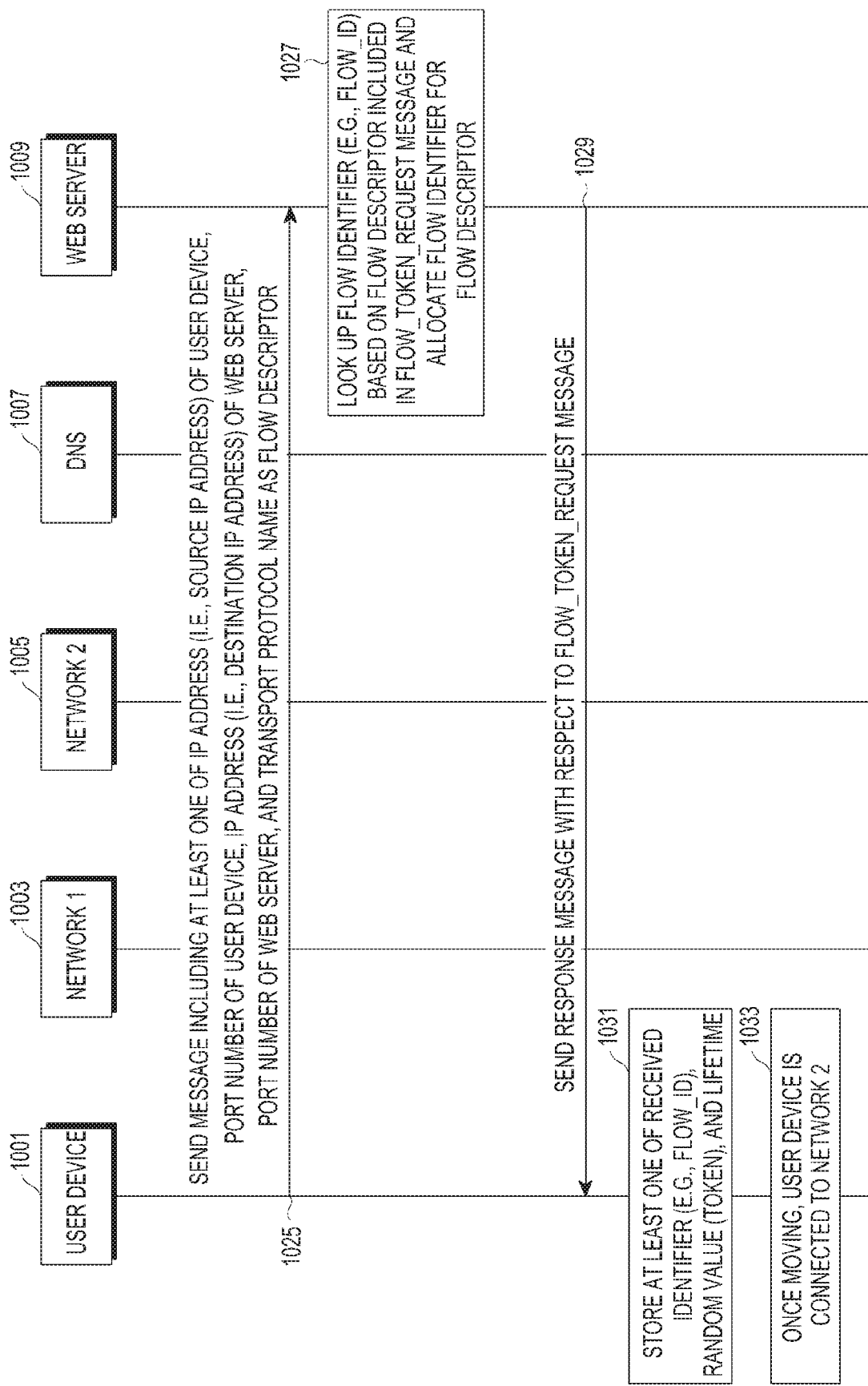
Figure 10C:
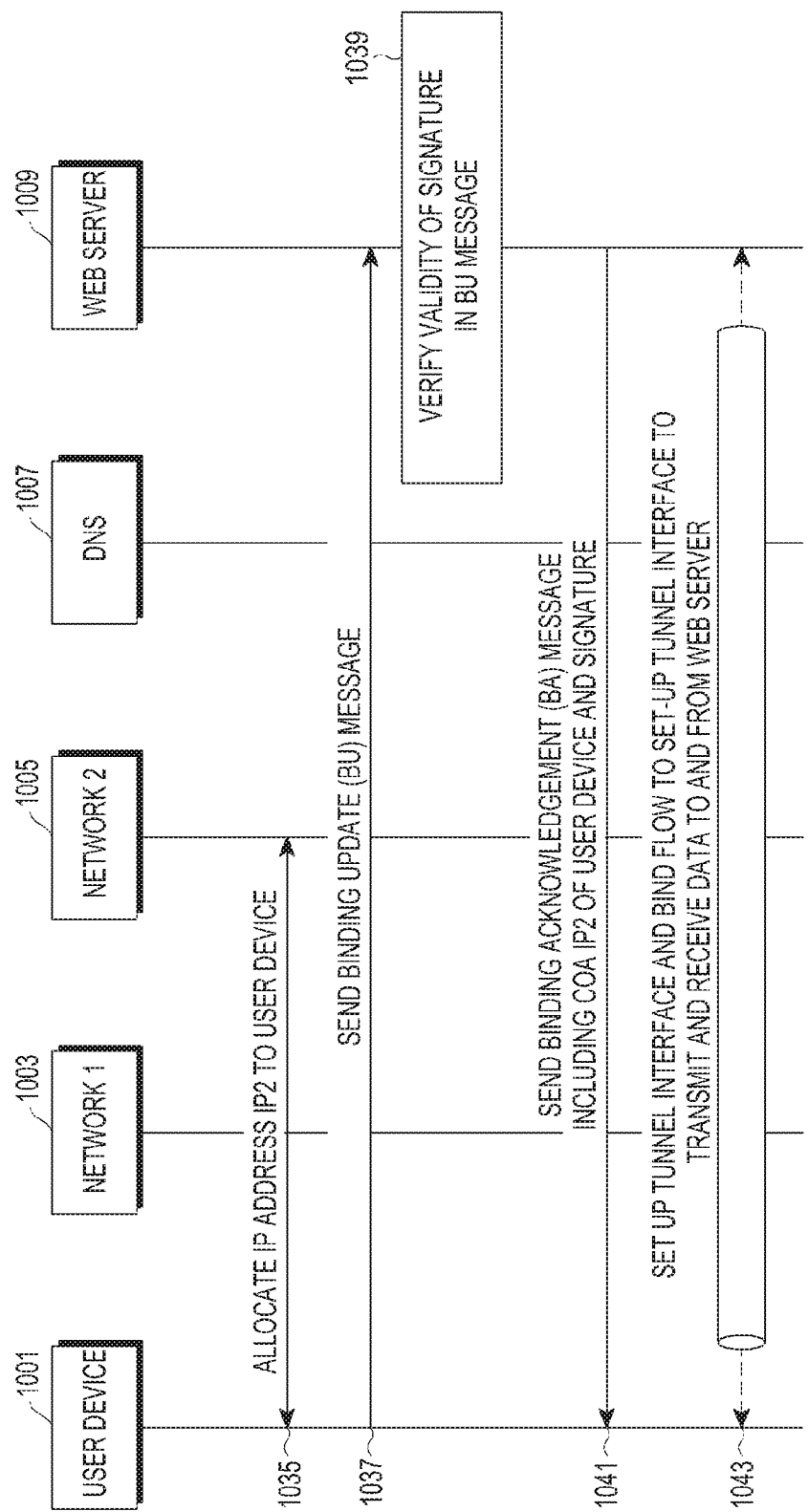

FIGS. 10A through 10C are ladder diagrams of a method using a port control protocol (PCP) (RFC 6887) according to the present disclosure.

If there is an NAT on a network, an IP address and a port number used by a user equipment (UE) 1001 are different from an IP address and a port number by which a web server 1009 recognizes the UE 1001. Thus, the web server 1009 may not match the flow descriptor of operation 725 to an IP address and a port number known to the transport layer. This problem may occur only in IPv4 using the NAT. In IPv6 that does not use the NAT, such a problem does not occur.

Hereinbelow, a method for solving a problem occurring due to the use of the NAT will be described.

In the method using the PCP, networks use the PCP and a user equipment (UE) generates an NAT table entry and performs mapping using the PCP.

Operations 1011, 1013, 1015, 1017, and 1019 are the same as operations 711, 713, 715, 717, and 719 of FIG. 7, and thus will not be described.

A user equipment (UE) 1001 sends a request for an external IP address and a port number to be used by the NAT to a network 1 1003 to generate a mapping entry on the NAT by using the PCP in operation 1021.

The network 1 1003 transmits the requested external IP address and port number to be used by the NAT to the UE 1001 in operation 1023.

Thereafter, the UE 1001 uses the received external IP address and port number in place of an original IP address and an original port number. The web server receives a message including the obtained external IP address and port number.

Operations 1025, 1027, 1029, 1031, 1033, 1035, 1037, 1039, 1041, and 1043 are the same as operations 721, 723, 725, 727, 729, 731, 733, 735, 737, and 739 of FIG. 7, and thus will not be described.

Figure 11A:
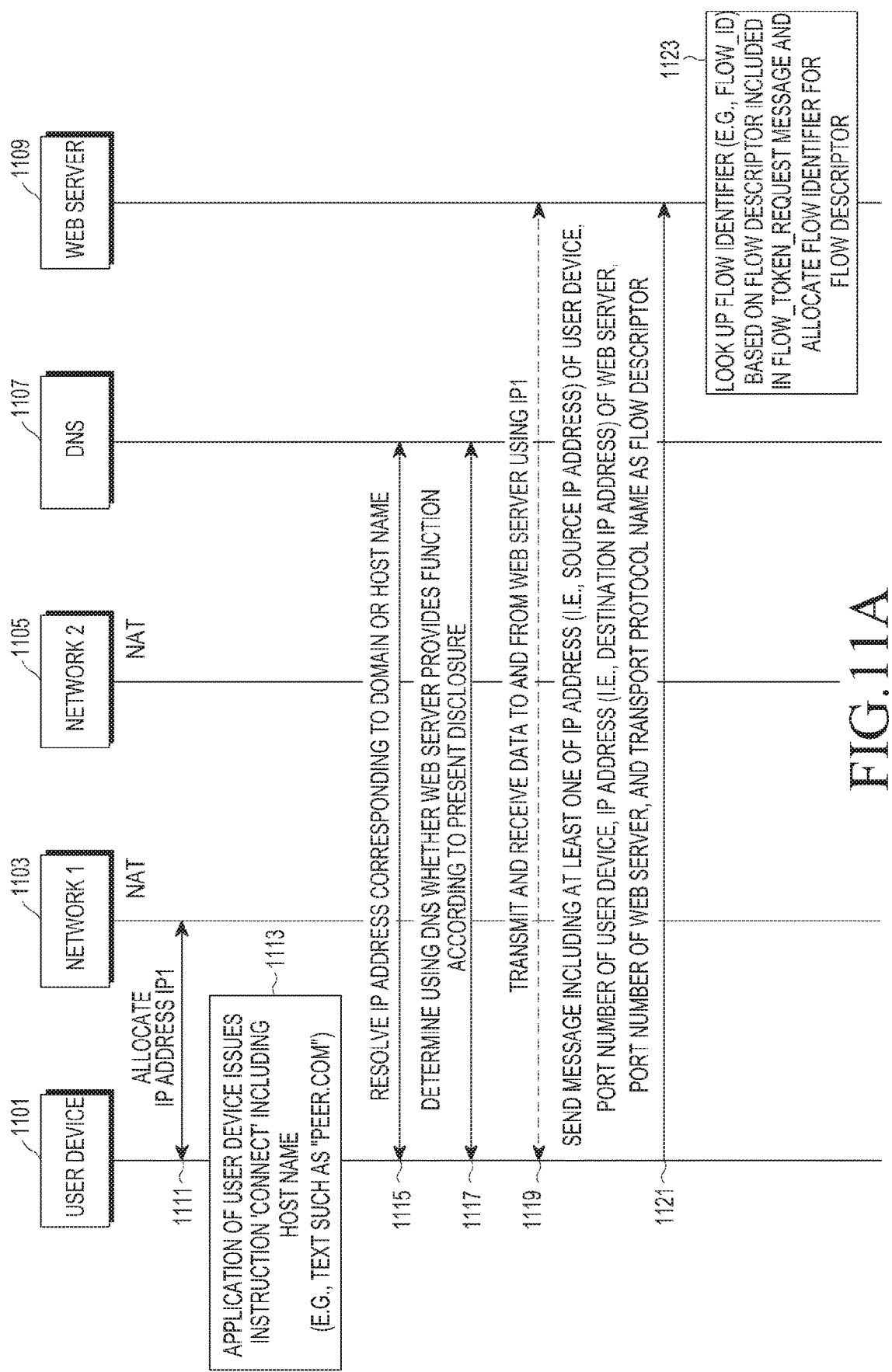

FIGS. 11A and 11B are ladder diagrams of a method that uses a protocol other than a PCP even when a network includes an NAT, according to the present disclosure.

Operations 1111, 1113, 1115, 1117, and 1119 are the same as operations 711, 713, 715, 717, and 719 of FIG. 7, and thus will not be described.

A user equipment (UE) 1101 transmits a flow descriptor including a flow signature to a web server 1109 in operation 1121. The flow signature may include a hash (e.g., a secure hash algorithm (SHA)) 256 of transport layer payloads of initial N packets transmitted and received and the N.

For example, if N is 3, the flow signature may be (SHA 256(tp-up1, tp-up2, tp-up3, tp-pu1, tp-pu2, tp-pu3), 3). Herein, tp-upN indicates a transport payload of an Nth packet transmitted to the web server 1109 by the UE 1101, and tp-puN indicates a transport payload of an Nth packet transmitted to the UE 1101 by the web server 1109.

The web server 1109 calculates and stores the received flow signature. The web server 1109 may use a previously generated lookup table to match the received flow signature.

The N may be a fixed value or may be changed by the UE based on data transmission characteristics.

Operations 1123, 1125, 1127, 1129, 1131, 1133, 1135, 1137, and 1139 are the same as operations 723, 725, 727, 729, 731, 733, 735, 737, and 739 of FIG. 7, and thus will not be described.

Figure 12:
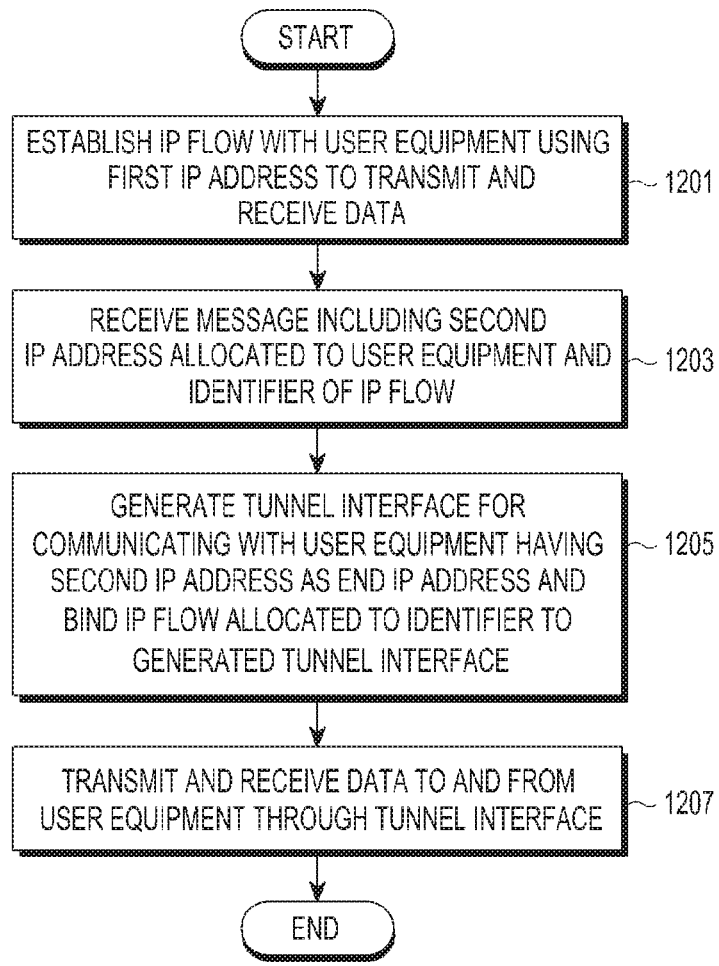
FIG. 12 is a flowchart of an operation of a web server supporting the mobility of a user equipment (UE) according to the present disclosure.

FIG. 12 is a flowchart of an operation of a web server supporting the mobility of a user equipment (UE) according to the present disclosure.

The web server establishes an IP flow with a user equipment (UE) using a first IP address to transmit and receive data in operation 1201.

The web server receives a message including a second IP address allocated to the UE and an identifier of the IP flow in operation 1203.

The web server generates a tunnel interface for communicating with the UE having the second IP address as an end IP address and binds the IP flow allocated to the identifier to the generated tunnel interface in operation 1205.

The web server transmits and receives data to and from the user terminal through the tunnel interface in operation 1207.

Figure 13:
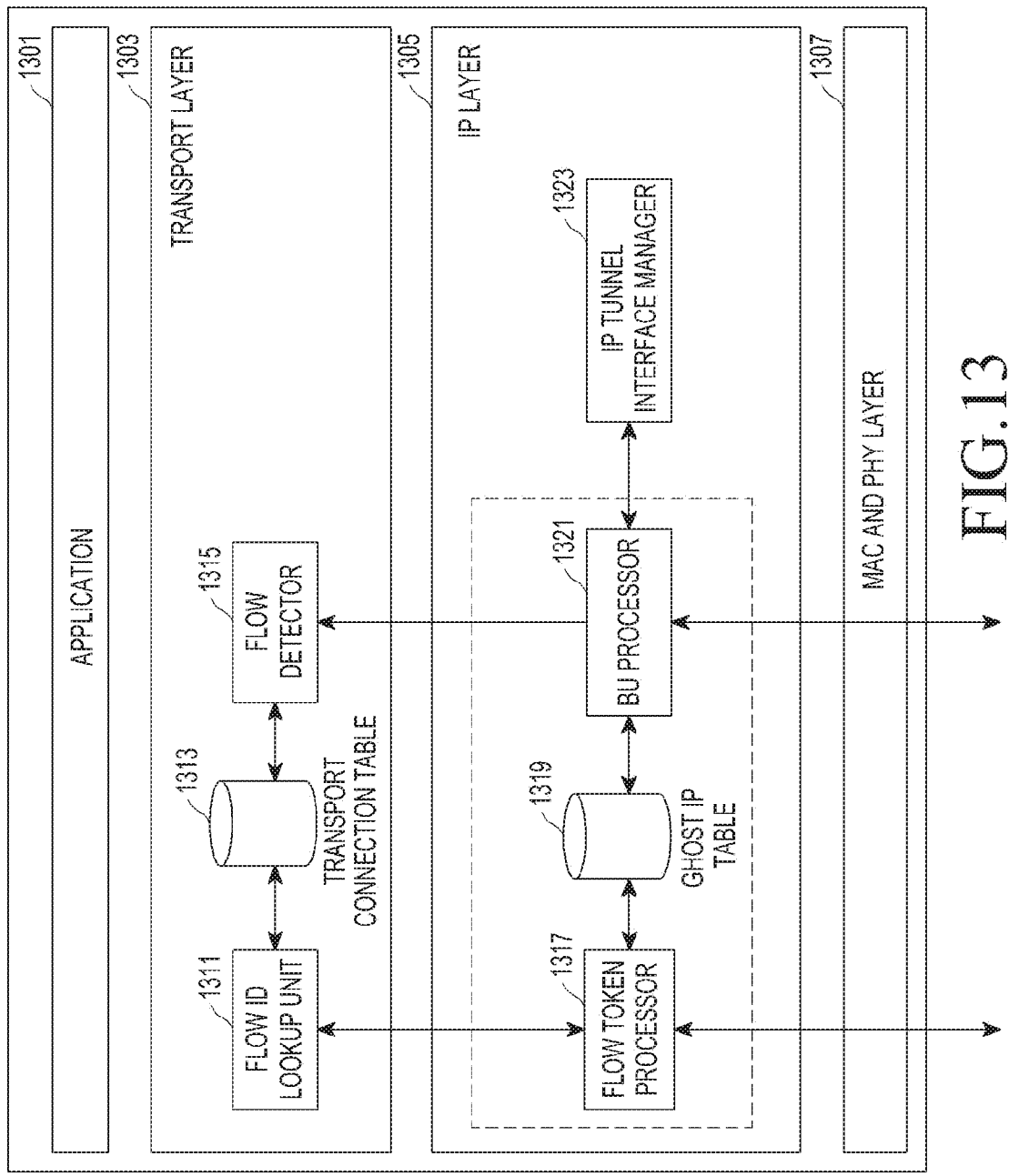
FIG. 13 is a structural diagram of a web server.

FIG. 13 is a structural diagram of a web server.

Like the UE, the web server may roughly include four layers. The four layers may include an application 1301, a transport layer 1301, an IP layer 1305, and a media access control (MAC) and physical (PHY) layer 1307.

A flow ID lookup unit 1311 uses a transport connection table 1313 to map a flow to a flow identifier.

A flow token processor 1317 processes a received flow_token_request message and transmits a flow descriptor included in the flow_token_request message to the flow ID lookup unit 1311. Once the flow ID is transmitted to the flow token processor 1317, the flow token processor 1317 generates a flow_token_response message.

A ghost IP table 1319 stores a state related to a flow.

A BU processor 1321 processes a packet if the web server receives a BU message. If the BU message is received, the BU processor 1321 causes an IP tunnel interface manager 1323 to set a tunnel interface and obtains an ID of the tunnel interface.

An interface ID update 1315 receives the flow ID and the ID of the tunnel interface from the BU processor 1321.

The transport connection table 1313 may store the ID of the tunnel interface.

Figure 14:
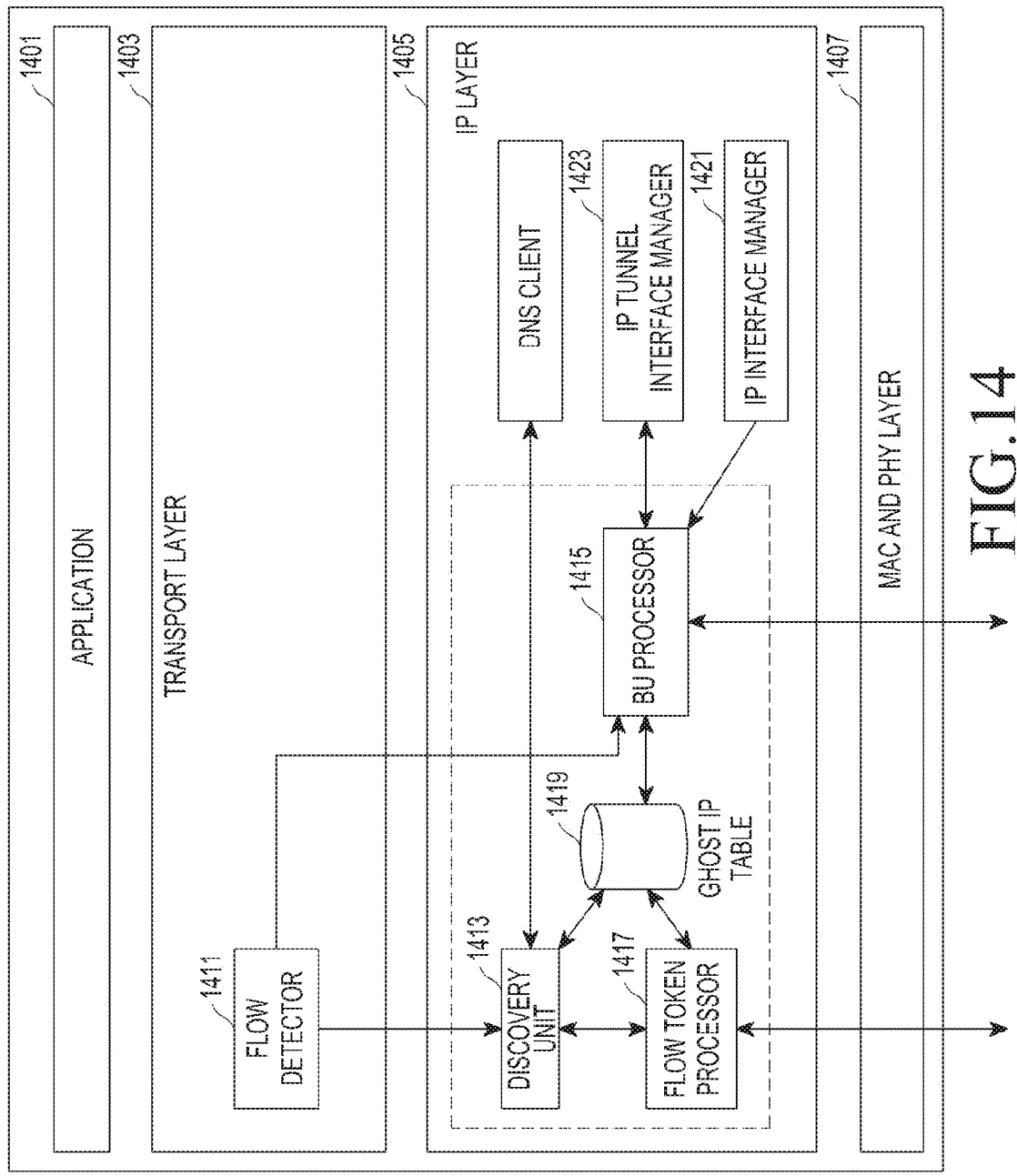
FIG. 14 is a structural diagram of a user equipment (UE).

FIG. 14 is a structural diagram of a user equipment (UE).

The UE may roughly include four layers. The four layers may include an application 1401, a transport layer 1403, an IP layer 1405, and a MAC and PHY layer 1407.

A flow detector 1411 may be included in the transport layer 1403. The flow detector 1411 detects a flow event and triggers other elements of the UE.

A discovery unit 1413 may be included in the IP layer 1405. Once new data transmission is initiated, the discovery unit 1413 is triggered by the flow detector 1411 to determine whether the web server supports a function according to the present disclosure.

A BU processor 1415 may be included in the IP layer 1405 and processes a BU message. For example, if a flow is terminated, the flow detector 1411 triggers the BU processor 1415 to send a BU message in which a lifetime is set to 0.

A flow token processor 1417 may be included in the IP layer 1405, and sends a flow_token_request message or processes a flow_token_response message. The flow token processor 1417 is triggered by the discovery unit 1413 that has determined whether the web server supports a function according to the present disclosure.

A ghost IP table 1419 may be included in the IP layer 1405, and stores a state related to a flow and a ghost IP address.

An IP interface manager 1421 detects a change of an IP address, generates a proper BU message, and triggers the BU processor 1415 that processes a received BA message.

An IP tunnel interface manager 1423 sets up a new tunnel. Herein, the present disclosure has been described using multiple elements, but if necessary, the above-described operations may be performed by a single element. Each element may not exist on a particular layer.

Meanwhile, embodiments disclosed in the present specification and drawings have been provided to easily describe the present disclosure and to help understanding of the present disclosure, and are not intended to limit the scope of the present disclosure.

That is, it would be obvious to those of ordinary skill in the art that many variations and modifications can be made to the disclosed embodiments based on the technical spirit of the present disclosure. In addition, the embodiments may be used in combination if necessary.

The invention claimed is:

1. A method for supporting mobility of a user equipment (UE) by a server in a mobile communication network, the method comprising:

transmitting, by the server through an internet protocol (IP) flow, data to the UE having a first IP address allocated to the UE in a first network;

receiving, from the UE, a first message for requesting allocation of a flow identifier of the IP flow associated with the first IP address;

allocating, by the server, the flow identifier of the IP flow based on the first message including the first IP address;

transmitting, to the UE, a response message comprising the flow identifier;

receiving, from the UE having a second IP address allocated to the UE in a second network, a second message comprising the flow identifier and the second IP address; and generating, by the server, a tunnel interface for communicating with the UE having the second IP address as an end IP address;

binding the IP flow to the generated tunnel interface; and transmitting, by the server, data to the UE in the second network through the tunnel interface bound to the IP flow.

2. The method of claim 1, wherein the response message comprises the flow identifier of the IP flow, a lifetime of the IP flow, and a token.

3. The method of claim 2, further comprising:
determining whether the lifetime of the IP flow has expired; and
performing a subsequent operation if the lifetime has not expired.

4. The method of claim 1, wherein the second message further comprises the first IP address.

5. The method of claim 1, wherein the second message is a binding update (BU) message.

6. A method for a user equipment (UE) that supports mobility in a mobile communication network, the method comprising:
receiving, from a server by the UE having a first IP address allocated to the UE in a first network, data through an internet protocol (IP) flow;
transmitting, to the server, a first message for requesting allocation of a flow identifier of the IP flow associated with the first IP address;
receiving, from the server, a response message comprising the flow identifier;
transmitting, to the server by the UE having a second IP address allocated to the UE in a second network, a second message comprising the flow identifier and the second IP address; and
receiving, from the server by the UE in the second network, data through a tunnel interface for communicating between the server and the UE having the second IP address as an end IP address, the tunnel interface being bound to the IP flow.

7. The method of claim 6, wherein the response message comprises the flow identifier of the IP flow, a lifetime of the IP flow, and a token from the server.

8. The method of claim 7, further comprising deleting the flow identifier of the IP flow and the token if the lifetime of the IP flow has expired.

9. The method of claim 6, wherein the second message is a binding update (BU) message.

10. The method of claim 6, wherein the second message further comprises the first IP address.

11. A server that supports mobility of a user equipment (UE) in a mobile communication network, comprising:
a transceiver; and
a processor configured to:
transmit, to the UE having a first IP address allocated to the UE in a first network via the transceiver, data through an internet protocol (IP) flow;
receive, from the UE in the first network via the transceiver, a first message for requesting allocation of a flow identifier of the IP flow associated with the first IP address;
allocate the flow identifier of the IP flow based on the first message including the first IP address;
transmit, to the UE via the transceiver, a response message comprising the flow identifier;
receive, from the UE having a second IP address allocated to the UE in a second network via the transceiver, a second message comprising the flow identifier and the second IP address; and
generate a tunnel interface for communicating with the UE having the second IP address as an end IP address;
bind the IP flow to the generated tunnel interface; and
transmit, via the transceiver, data to the UE in the second network through the tunnel interface bound to the IP flow.

12. The server of claim 11, wherein
the response message comprises the flow identifier of the IP flow, a lifetime of the IP flow, and a token.

13. The server of claim 12, wherein the processor is further configured to:
determine whether the lifetime of the IP flow has expired; and
perform a subsequent operation if the lifetime has not expired.

14. The server of claim 11, wherein the second message further comprises the first IP address.

15. The server of claim 11, wherein the second message is a binding update (BU) message.

16. A user equipment (UE) that supports mobility in a mobile communication network, comprising:
a transceiver; and
a processor configured to:
receive, from a server by the UE having a first IP address allocated to the UE in a first network via the transceiver, data through an internet protocol (IP) flow;
transmit, to the server via the transceiver, a first message for requesting allocation of a flow identifier of the IP flow associated with the first IP address;
receive, from the server via the transceiver, a response message comprising the flow identifier;
transmit, to the server by the UE having a second IP address allocated to the UE in a second network via the transceiver, a second message comprising the flow identifier and the second IP address; and
receive, from the server by the UE in the second network via the transceiver, data through a tunnel interface for communicating between the server and the UE having the second IP address as an end IP address, the tunnel interface being bound to the IP flow.

17. The UE of claim 16, wherein the response message comprises the flow identifier of the IP flow, a lifetime of the IP flow, and a token from the server.

18. The UE of claim 17, wherein the processor is further configured to delete the flow identifier of the IP flow and the token if the lifetime of the IP flow has expired.

19. The UE of claim 16, wherein the second message is a binding update (BU) message.

20. The UE of claim 16, wherein the second message further comprises the first IP address.

* * * * *